(12) United States Patent
Pan et al.

(10) Patent No.: US 11,901,804 B2
(45) Date of Patent: Feb. 13, 2024

(54) POWER SUPPLYING CIRCUIT AND POWER SUPPLYING METHOD

(71) Applicant: Realtek Semiconductor Corporation, Hsinchu (TW)

(72) Inventors: Jiun Hung Pan, Hsinchu (TW); Leaf Chen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 0 days.

(21) Appl. No.: 17/808,537

(22) Filed: Jun. 23, 2022

(65) Prior Publication Data

US 2023/0155480 A1 May 18, 2023

(30) Foreign Application Priority Data

Nov. 16, 2021 (TW) ................................ 110142596

(51) Int. Cl.
*H02M 1/088* (2006.01)
*H02M 3/158* (2006.01)
*H02M 3/155* (2006.01)

(52) U.S. Cl.
CPC ........... *H02M 1/088* (2013.01); *H02M 3/155* (2013.01); *H02M 3/158* (2013.01)

(58) Field of Classification Search
CPC .................... H02M 1/088; H02M 3/155–1588
See application file for complete search history.

(56) References Cited

U.S. PATENT DOCUMENTS

| | | | | |
|---|---|---|---|---|
| 5,424,663 | A * | 6/1995 | Wong ...................... | G01R 19/10 327/69 |
| 6,559,689 | B1 * | 5/2003 | Clark ................... | H03K 17/063 327/91 |
| 7,851,947 | B2 * | 12/2010 | Cassia .................. | H03K 17/693 307/113 |
| 9,329,649 | B2 * | 5/2016 | Gasparini ................ | G06F 1/26 |
| 9,369,044 | B2 * | 6/2016 | Teh ..................... | H02M 3/1584 |

(Continued)

FOREIGN PATENT DOCUMENTS

CN 101604867 B 5/2011

OTHER PUBLICATIONS

Alex Triano, "Application Report: Basics of Power MUX," SLVAE51A—Nov. 2018—Revised Oct. 2020, Texas Instruments Incorporated.

*Primary Examiner* — Yusef A Ahmed
(74) *Attorney, Agent, or Firm* — CKC & Partners Co., LLC

(57) ABSTRACT

A power supplying circuit includes a first high-voltage switch, a first low-voltage switch, a second high-voltage switch, a second low-voltage switch, and a controller circuit. The first high-voltage switch receives a first input voltage and generates a first node voltage. The first low-voltage switch is coupled between the first high-voltage switch and an output terminal. The second high-voltage switch receives a second input voltage and generates a second node voltage. The second low-voltage switch is coupled between the second high-voltage switch and the output terminal. The controller circuit controls the first high-voltage switch, the first low-voltage switch, the second high-voltage switch, and the second low-voltage switch according to the first node voltage and the second node voltage such that an output voltage is outputted to the output terminal.

15 Claims, 5 Drawing Sheets

(56) References Cited

U.S. PATENT DOCUMENTS

| | | | |
|---|---|---|---|
| 2013/0113450 A1* | 5/2013 | Tang | H02M 1/00 |
| | | | 323/283 |
| 2014/0139029 A1* | 5/2014 | Gasparini | G06F 1/26 |
| | | | 307/80 |
| 2014/0264578 A1* | 9/2014 | Woo | H03K 17/6874 |
| | | | 257/337 |
| 2015/0028920 A1* | 1/2015 | Ferrant | H03K 17/735 |
| | | | 326/38 |
| 2017/0271883 A1* | 9/2017 | Cai | H03K 17/6874 |
| 2017/0302180 A1* | 10/2017 | Villar Piqué | G05F 1/56 |
| 2018/0019673 A1* | 1/2018 | Cai | H02M 1/088 |
| 2018/0139076 A1* | 5/2018 | Watabe | H04L 25/0272 |
| 2018/0183427 A1* | 6/2018 | Nakajima | H01L 29/7815 |
| 2019/0312514 A1* | 10/2019 | Hukel | H02M 3/07 |
| 2022/0155838 A1* | 5/2022 | Scheel | G06F 1/30 |
| 2022/0190820 A1* | 6/2022 | Chiu | H03K 17/161 |

* cited by examiner

POWER SUPPLYING CIRCUIT AND POWER SUPPLYING METHOD

RELATED APPLICATIONS

This application claims priority to Taiwanese Application Serial Number 110142596, filed Nov. 16, 2021, which is herein incorporated by reference.

BACKGROUND

Technical Field

The present disclosure relates to power supplying technology. More particularly, the present disclosure relates to a power supplying circuit and a power supplying method that can reduce the circuit area.

Description of Related Art

With development of technology, electronic devices support more functions applicable to various application scenarios. Based on these requirements, many electronic devices are designed with multiple power port to support various functions or to adapt various application scenarios. For controlling these power ports, a control chip can be disposed inside the electronic device, and this control chip can enable one power path of one power port to supply power to other circuits and can disable power paths of other power ports to avoid current backflow.

SUMMARY

Some aspects of the present disclosure are to provide a power supplying circuit. The power supplying circuit includes a first high-voltage switch, a first low-voltage switch, a second high-voltage switch, a second low-voltage switch, and a controller circuit. The first high-voltage switch is configured to receive a first input voltage and generate a first node voltage. The first low-voltage switch is coupled between the first high-voltage switch and an output terminal. The second high-voltage switch is configured to receive a second input voltage and generate a second node voltage. The second low-voltage switch is coupled between the second high-voltage switch and the output terminal. The controller circuit is configured to control the first high-voltage switch, the first low-voltage switch, the second high-voltage switch, and the second low-voltage switch according to the first node voltage and the second node voltage such that an output voltage is outputted to the output terminal.

Some aspects of the present disclosure are to provide a power supplying method. The power supplying method includes following operations: receiving, by a first high-voltage switch, a first input voltage and generating, by the first high-voltage switch, a first node voltage; receiving, by a second high-voltage switch, a second input voltage and generating, by the second high-voltage switch, a second node voltage; and controlling, by a controller circuit, the first high-voltage switch, a first low-voltage switch, the second high-voltage switch, and a second low-voltage switch according to the first node voltage and the second node voltage such that an output voltage is outputted to an output terminal. The first low-voltage switch is coupled between the first high-voltage switch and the output terminal, and the second low-voltage switch is coupled between the second high-voltage switch and the output terminal.

As described above, in the power supplying circuit and the power supplying method of the present disclose, some elements can be implemented by low-voltage elements (with relatively low withstand voltage). Accordingly, the circuit area and the chip cost can be reduced.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
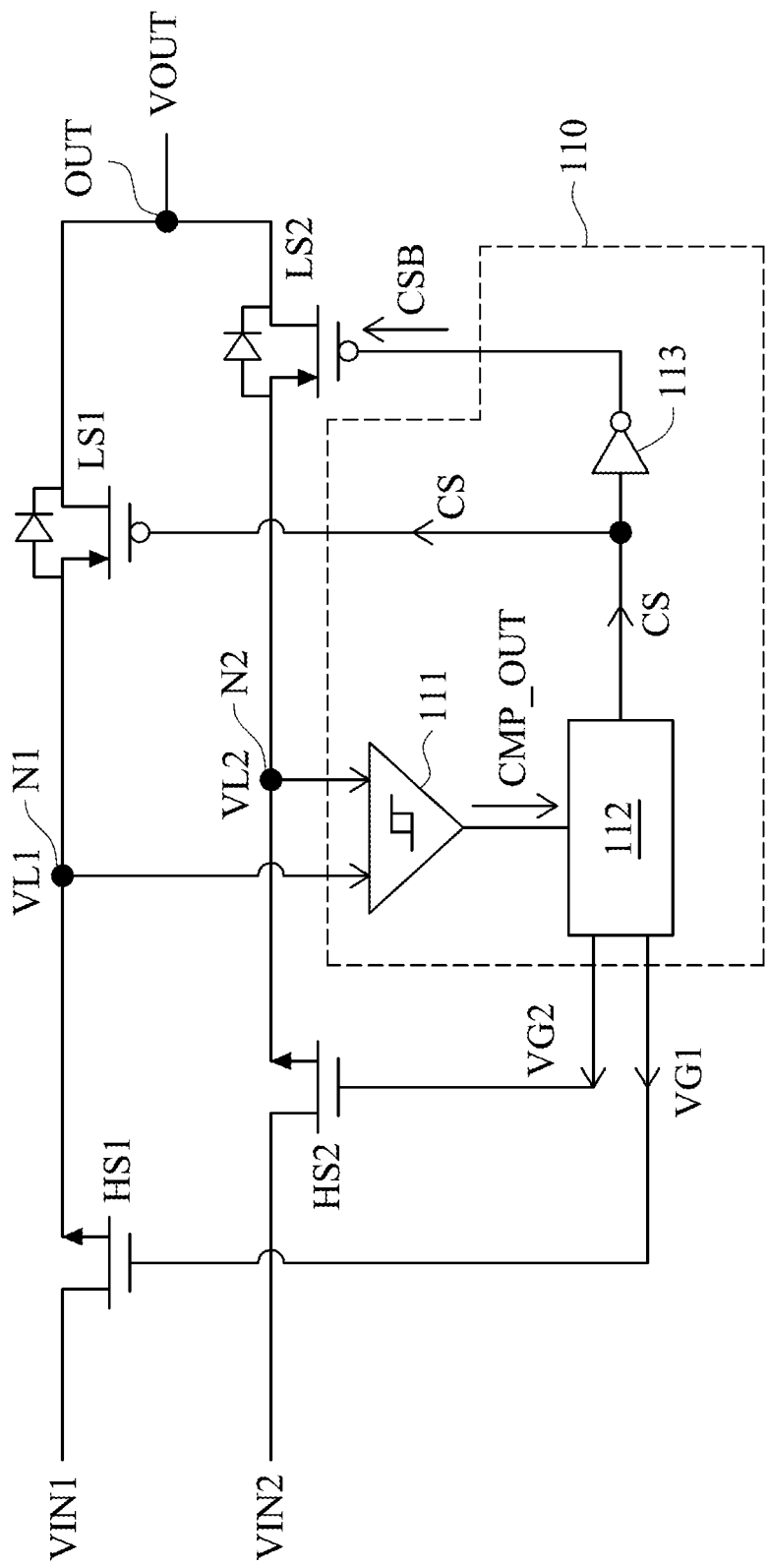
FIG. 1 is a schematic diagram of a power supplying circuit according to some embodiments of the present disclosure.

Reference is made to FIG. 1. FIG. 1 is a schematic diagram of a power supplying circuit 100 according to some embodiments of the present disclosure.

As illustrated in FIG. 1, the power supplying circuit 100 can receive an input voltage VIN1 and an input voltage VIN2. The power supplying circuit 100 can enable (i.e., turn on) a power path of one of the input voltage VIN1 or the input voltage VIN2 and disable (i.e., cut off) a power path of the other one of the input voltage VIN1 or the input voltage VIN2. For example, when the power supplying circuit 100 enables the power path of the input voltage VIN1, the power path of the input voltage VIN2 is disabled. On the contrary, when the power supplying circuit 100 enables the power path of the input voltage VIN2, the power path of the input voltage VIN1 is disable.

Then, the power supplying circuit 100 can generate an output voltage VOUT at an output terminal OUT according to the input voltage (i.e., the input voltage VIN1 or the input voltage VIN2) corresponding to the enabled power path. In some embodiments, the output voltage VOUT is lower than the input voltage VIN1 (or the input voltage VIN2). In other words, the power supplying circuit 100 not only enables on one of the power paths, but also performs a voltage conversion process (e.g., buck) on the corresponding input voltage to generate the output voltage VOUT.

In some embodiments, a voltage value of the input voltage VIN1 is different from a voltage value of the input voltage VIN2. The power supplying circuit 100 (e.g., a power control IC) disposed in a laptop computer is taken as an example. The input voltage VIN1, for example, 20 volts, can be supplied from an adaptor. The input voltage VIN2, for example, 12 volts, can be supplied from a battery of the laptop computer. The power supplying circuit 100 can enable one power path and disable the other power path, and convert 20 volts or 12 volts into 3.3 volts to be the output voltage VOUT. Then, the output voltage VOUT with 3.3 volts can be supplied to other chips or other circuits in the laptop computer.

However, the present disclosure is not limited to the example above, and various suitable cases are with the contemplated scopes of the present disclosure.

As illustrated in FIG. 1, the power supplying circuit 100 includes a high-voltage switch HS1, a low-voltage switch LS1, a high-voltage switch HS2, a low-voltage switch LS2, and a control circuit 110. The high-voltage switch HS1 and the high-voltage switch HS2 can be implemented by N-type transistors, and the low-voltage switch LS1 and the low-voltage switch LS2 can be implemented by P-type transistors.

The high-voltage switch HS1 is used to receive the input voltage VIN1. The low-voltage switch LS1 is coupled between the high-voltage switch HS1 and the output terminal OUT. The high-voltage switch HS1 and the low-voltage switch LS1 form a first power path. The high-voltage switch HS1 generates a node voltage VL1 at a node N1 according to the input voltage VIN1 and a control signal VG1 from the control circuit 110, in which the node N1 is between the high-voltage switch HS1 and the low-voltage switch LS1.

The high-voltage switch HS2 is used to receive the input voltage VIN2. The low-voltage switch LS2 is coupled between the high-voltage switch HS2 and the output terminal OUT. The high-voltage switch HS2 and the low-voltage switch LS2 from a second power path. The high-voltage switch HS2 generates a node voltage VL2 at a node N2 according to the input voltage VIN2 and a control signal VG2 from the control circuit 110, in which the node N2 is between the high-voltage switch HS2 and the low-voltage switch LS2.

In some related approaches, a P-type transistor is used to receive an input voltage. However, in these related approaches, it needs to dispose an additional high-voltage to low-voltage conversion circuit at an output terminal of the P-type transistor.

Compared to the related approaches above, in the present disclosure, the high-voltage switches HS1-HS2 used to receive the input voltages VIN1-VIN2 are implemented by N-type transistors. The high-voltage switches HS1-HS2 implemented by N-type transistors can block relatively high voltages. Taking the high-voltage switch HS1 as an example, when a difference between a gate voltage of the high-voltage switch HS1 and a source voltage of the high-voltage switch HS1 is greater than a threshold voltage of the high-voltage switch HS1, the high-voltage switch HS1 is turned on and the source voltage (i.e., the node voltage VL1) of the high-voltage switch HS1 is pulled up according to a drain voltage (i.e., the input voltage VIN1) of the high-voltage switch HS1. However, when the difference between the gate voltage of the high-voltage switch HS1 and the source voltage of the high-voltage switch HS1 is equal to or less than the threshold voltage of the high-voltage switch HS1, the high-voltage switch HS1 is turned off. In other words, the source voltage (i.e., the node voltage VL1) of the high-voltage switch HS1 is limited by the gate voltage (i.e., the voltage value of the control signal VG1) of the high-voltage switch HS1 such that the node voltages VL1-VL2 are outputted with relatively low voltages. Accordingly, the present disclosure does not need to employ additional high-voltage to low-voltage conversion circuit at the output terminal of the high-voltage switches HS1-HS2. Thus, the circuit area and the chip cost can be reduced.

Then, the control circuit 110 can control the high-voltage switch HS1, the low-voltage switch LS1, the high-voltage switch HS2, and the low-voltage switch LS2 according to the node voltage VL1 and the node voltage VL2 to generate the output voltage VOUT to the output terminal OUT.

As illustrated in FIG. 1, the control circuit 110 includes a low-voltage comparator 111, a low-voltage controller 112, and an inverter 113. The low-voltage comparator 111 includes a first input terminal, a second input terminal, and an output terminal. The low-voltage controller 112 includes an input terminal, a first output terminal, a second output terminal, and a third output terminal. The inverter 113 includes an input terminal and an output terminal.

A first input terminal of the low-voltage comparator 111 is coupled to the node N1 between the high-voltage switch HS1 and the low-voltage switch LS1 to receive the node voltage VL1. A second input terminal of the low-voltage comparator 111 is coupled to the node N2 between the high-voltage switch HS2 and the low-voltage switch LS2 to receive the node voltage VL2. The output terminal of the low-voltage comparator 111 is coupled to the input terminal of the low-voltage controller 112. The first output terminal of the low-voltage controller 112 is coupled to a gate terminal of the high-voltage switch HS1. The second output terminal of the low-voltage controller 112 is coupled to a gate terminal of the high-voltage switch HS2. The third output terminal of the low-voltage controller 112 is coupled to a gate terminal of the low-voltage switch LS1 and the input terminal of the inverter 113. The output terminal of the inverter 113 is coupled to a gate terminal of the low-voltage switch LS2.

Figure 2:
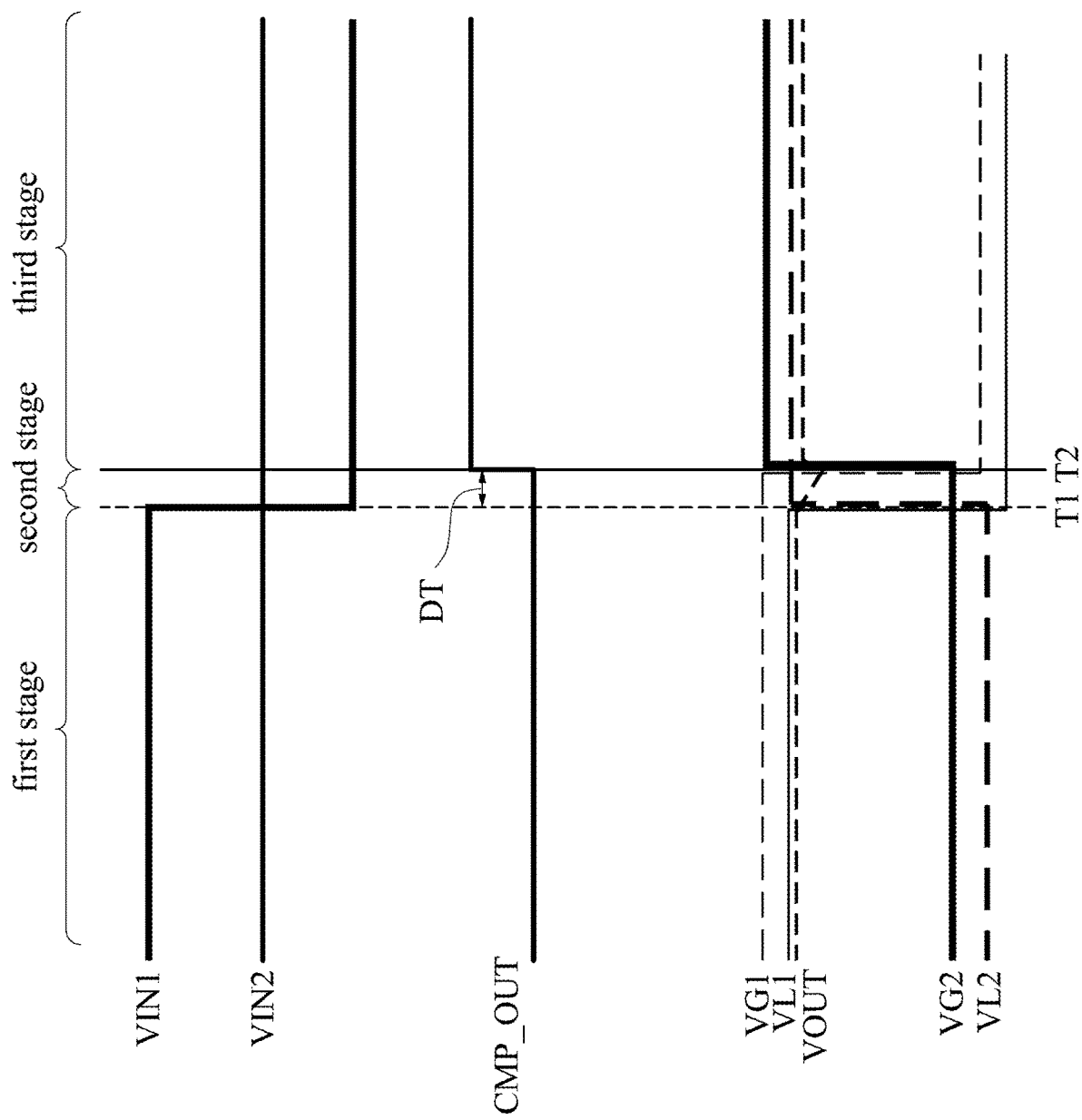
FIG. 2 is a waveform diagram of the power supplying circuit in FIG. 1 according to some embodiments of the present disclosure.

References are made to FIG. 1 and FIG. 2. FIG. 2 is a waveform diagram of the power supplying circuit 100 in FIG. 1 according to some embodiments of the present disclosure.

As illustrated in FIG. 2, in the first stage, it is assumed that the input voltage VIN1 is higher than the input voltage VIN2, and a voltage value of the control signal VG1 can be preset to be greater than a voltage value of the control signal VG2. In this case, as described above, since the node voltage VL1 (i.e., the source voltage of the high-voltage switch HS1) is limited by the voltage value of the control signal VG1 (i.e., the gate voltage of the high-voltage switch HS1) and the node voltage VL2 (i.e., the source voltage of the high-voltage switch HS2) is limited by the voltage value of the control signal VG2 (i.e., the gate voltage of the high-voltage switch HS2), the node voltage VL1 is higher than the node voltage VL2. The low-voltage comparator 111 can compare the node voltage VL1 and the node voltage VL2 to generate the comparison result signal CMP_OUT. When the node voltage VL1 is higher than the node voltage VL2, the low-voltage comparator 111 can output the comparison result signal CMP_OUT with a first logic value (e.g., a logic value 0).

The low-voltage controller 112 can receive the comparison result signal CMP_OUT with the first logic value (e.g., the logic value 0), and can output a control signal CS according to the comparison result signal CMP_OUT with the first logic value (e.g., the logic value 0) to control the low-voltage switch LS1 and the low-voltage switch LS2. To be more specific, the low-voltage controller 112 can output the control signal CS with the first logic value (e.g., the logic value 0) according to the comparison result signal CMP_OUT with the first logic value (e.g., the logic value 0) to turn on the low-voltage switch LS1. Since the low-voltage switch LS1 and the high-voltage switch HS1 are turned on, the first power path corresponding to the input voltage VIN1 is enabled. The turned-on high-voltage switch HS1 can generate the node voltage VL1 and the node voltage VL1 can charge the output terminal OUT through the turned-on low-voltage switch LS1 such that the output voltage VOUT in the first stage approaches the node voltage VL1. In addition, the inverter 113 can generate an inversion control signal CSB with a second logic value (e.g., a logic value 1) according to the control signal CS from the low-voltage controller 112 and with the first logic value (e.g., the logic value 0). The inversion control signal CSB can turn off the low-voltage switch LS2. Since the low-voltage switch LS2 is turned off, the second power path corresponding to the input voltage VIN2 is disabled to avoid current backflow.

As the node voltage VL1 (i.e., the input voltage VIN1) continues to charge the output terminal OUT, the node voltage VL1 (i.e., the input voltage VIN1) drops in the second stage. As illustrated in FIG. 2, in the second stage, the node voltage VL1 is lower than the node voltage VL2.

The low-voltage comparator 111 can compare the node voltage VL1 and the node voltage VL2 to generate the comparison result signal CMP_OUT. When the node voltage VL1 is lower than the node voltage VL2, the low-voltage comparator 111 can output the comparison result signal CMP_OUT with the second logic value (e.g., the logic value 1). In some embodiments, the low-voltage comparator 111 has a delay time DT. In other words, the node voltage VL1 turns to be lower than the node voltage VL2 at a first time point (a start time point T1 of the second stage in FIG. 2), the comparison result signal CMP_OUT turns to the second logic value (e.g., the logic value 1) at a second time point (an end time point T2 of the second stage in FIG. 2), and the second time point is later than the first time point for a delay time DT. In the delay time DT (i.e., during the second stage), the high-voltage switch HS1 and the low-voltage switch LS1 (i.e., the first power path) is still turned on. However, since the input voltage VIN1 (i.e, the node voltage VL1) of the first power path decreases and the second power path is disabled, the output voltage VOUT drops slightly in the second stage.

After the delay time DT (i.e., a third stage), the comparison result signal CMP_OUT turns to have the second logic value (e.g., the logic value 1). The low-voltage controller 112 can receive the comparison result signal CMP_OUT with the second logic value (e.g., the logic value 1) and output the control signal CS according to the comparison result signal CMP_OUT with the second logic value (e.g., the logic value 1) to control the low-voltage switch LS1 and the low-voltage switch LS2. To be more specific, the low-voltage controller 112 can output the control signal CS with the second logic value (e.g., the logic value 1) according to the comparison result signal CMP_OUT with the second logic value (e.g., the logic value 1) to turn off the low-voltage switch LS1. Since the low-voltage switch LS1 is turned off, the first power path corresponding to the input voltage VIN1 is disabled to avoid current backflow. In addition, the inverter 113 can generate the inversion control signal CSB with the first logic value (e.g., the logic value 0) according to the control signal CS having the second logic value (e.g., the logic value 1) from the low-voltage controller 112. The inversion control signal CSB can turn on the low-voltage switch LS2. Since both of the high-voltage switch HS2 and the low-voltage switch LS2 are turned on, the second power path corresponding to the input voltage VIN2 is enabled. In this case, the turned-on high-voltage switch HS2 can generate the node voltage VL2 and the node voltage VL2 can charge the output terminal OUT through the turned-on low-voltage switch LS2 such that the output voltage VOUT rises again in the third stage and approaches the node voltage VL2. In addition, the low-voltage controller 112 can reduce the voltage value of the control signal VG1 and increase the voltage value of the control signal VG2 (increase the upper limit of the node voltage VL2) according to the comparison result signal CMP_OUT having the second logic value (e.g., the logic value 1).

It is noted that the aforementioned "high-voltage" switches refer to switches with relatively high withstand voltages and the aforementioned "low-voltage" switches refer to switches with relatively low withstand voltages. In other words, a withstand voltage of the high-voltage switch HS1 (or the high-voltage switch HS2) is higher than a withstand voltage of the low-voltage switch LS1 (or the low-voltage switch LS2). In some embodiments, the withstand voltage of the high-voltage switch HS1 (or the high-voltage switch HS2) is equal to or higher than 20 volts, the withstand voltage of the low-voltage switch LS1 (or the low-voltage switch LS2) is equal to or lower than 5 volts, but the present disclosure is not limited thereto. For example, in some embodiments, the withstand voltage of the high-voltage switch HS1 (or the high-voltage switch HS2) is equal to or higher than 14 volts, and the withstand voltage of the low-voltage switch LS1 (or the low-voltage switch LS2) is equal to or lower than 6 volts.

In addition, the aforementioned "low-voltage" comparator and the aforementioned "low-voltage" controller are implemented by "low-voltage" transistors. The "low-voltage" transistors refer to transistors with relatively low withstand voltages. In some embodiments, the withstand voltage of a low-voltage transistor is equal to or lower than 5 volts, but the present disclosure is not limited thereto.

In some related approaches, the control circuit is implemented by high-voltage elements (e.g., transistors with relatively high withstand voltages). In these related approaches, since sizes of these high-voltage elements are larger, the circuit area of the control circuit implemented by the high-voltage elements is larger. In addition, response speeds of the high-voltage elements are slower than those of low-voltage elements.

Compared to the aforementioned related approaches, in the present disclosure, as described above, the source voltage (i.e., the node voltage VL1) of the high-voltage switch HS1 is limited by the gate voltage (i.e., the voltage value of the control signal VG1) of the high-voltage switch HS1, and the source voltage (i.e., the node voltage VL2) of the high-voltage switch HS2 is limited by the gate voltage (i.e., the voltage value of the control signal VG1) of the high-voltage switch HS2. Thus, the node voltage VL1 and the node voltage VL2 are outputted with relatively low voltages. Accordingly, the control circuit 110 at the rear end can be implemented by low-voltage elements (e.g., transistors with relatively low withstand voltages). Compared to the high-voltage elements, sizes of these low-voltage elements are smaller and these low-voltage elements have faster response speeds. Accordingly, the circuit area and the chip cost can be reduced, and the circuit performance can be better.

In some embodiments, the low-voltage comparator 111 is implemented with a voltage hysteresis mechanism to prevent the circuit from false action. Taking the aforementioned embodiments as an example, when the low-voltage comparator 111 detects that the node voltage VL1 is higher than the node voltage VL2, the comparison result signal CMP_OUT is not changed immediately. Until the low-voltage comparator 111 further detects that a difference between the node voltage VL1 and the node voltage VL2 is greater than a threshold voltage (e.g., 100 millivolts but the present disclosure is not limited thereto), the low-voltage comparator 111 outputs the comparison result signal CMP_OUT with the first logic value (e.g., the logic value 0). Similarly, when the low-voltage comparator 111 detects that the node voltage VL2 is higher than the node voltage VL1, the comparison result signal CMP_OUT is not changed immediately. Until the low-voltage comparator 111 further detects that a difference between the node voltage VL2 and the node voltage VL1 is greater than the threshold voltage, the low-voltage comparator 111 outputs the comparison result signal CMP_OUT with the second logic value (e.g., the logic value 1).

Although the voltage value of the control signal VG1 is preset to be greater than the voltage value of the control signal VG2 in the aforementioned embodiment, the present disclosure is not limited thereto. In some other embodiments, the voltage value of the control signal VG1 can also be preset to be equal to the voltage value of the control signal VG2.

For example, it is assumed that the input voltage VIN1 is different from the input voltage VIN2, a voltage value of the control signal VG1 is greater than the voltage value of the input voltage VIN1 and a different between them is greater than a threshold voltage of the high-voltage switch HS1, and a voltage value of the control signal VG2 is greater than the voltage value of the input voltage VIN2 and a different between them is greater than a threshold voltage of the high-voltage switch HS2. Although the voltage value of the control signal VG1 is equal to the voltage value of the control signal VG2, the voltage value of the node voltage VL1 can climb to a value equal to the voltage value of the input voltage VIN1, and the voltage value of the node voltage VL2 can climb to a value equal to the voltage value of the input voltage VIN2. Since the input voltage VIN1 is different from the input voltage VIN2 (the node voltage VL1 is different from the node voltage VL2), the low-voltage comparator 111 can still compare the node voltage VL1 and the node voltage VL2 to generate the comparison result signal CMP_OUT, and the low-voltage controller 112 can perform subsequent operations according to the comparison result signal CMP_OUT.

For example, it is assumed that the voltage value of the control signal VG1 is less than the voltage value of the input voltage VIN1 and the voltage value of the control signal VG2 is less than the voltage value of the input voltage VIN2. In this case, the node voltage VL1 is limited by the voltage value of the control signal VG1 and the node voltage VL2 is limited by the voltage value of the control signal VG2. Although the voltage value of the control signal VG1 is equal to the voltage value of the control signal VG2, the node voltage corresponding to the larger input voltage rises to the voltage value of the control signal VG1 or VG2 earlier. At this time, the other node voltage has not reached the voltage value of the control signal VG1 or VG2. Accordingly, the low-voltage comparator 111 can still compare the node voltage VL1 (e.g., already reached the voltage value of the control signal VG1) and the node voltage VL2 (e.g., has not reached the voltage value of the control signal VG2) to generate the comparison result signal CMP_OUT, and the low-voltage controller 112 can perform subsequent operations according to the comparison result signal CMP_OUT. For example, the low-voltage controller 112 can reduce the voltage value of the control signal (e.g., the control signal VG2) corresponding to smaller input voltage to reduce the upper limit of the node voltage (e.g., the node voltage VL2) of the corresponding power path.

In addition, the embodiments above is an example that the voltage value of the input voltage VIN1 is different from the voltage value of the input voltage VIN2, but the present disclosure is not limited thereto. In some other embodiments, the voltage value of the input voltage VIN1 can be equal to the voltage value of the input voltage VIN2. In these embodiments, the node voltage VL1 and the node voltage VL2 can be controlled by the voltage values of the control signal VG1 and the control signal VG2. Accordingly, the low-voltage comparator 111 can still compare the node voltage VL1 and the node voltage VL2 to generate the comparison result signal CMP_OUT, and the low-voltage controller 112 can perform subsequent operations according to the comparison result signal CMP_OUT.

Figure 3:
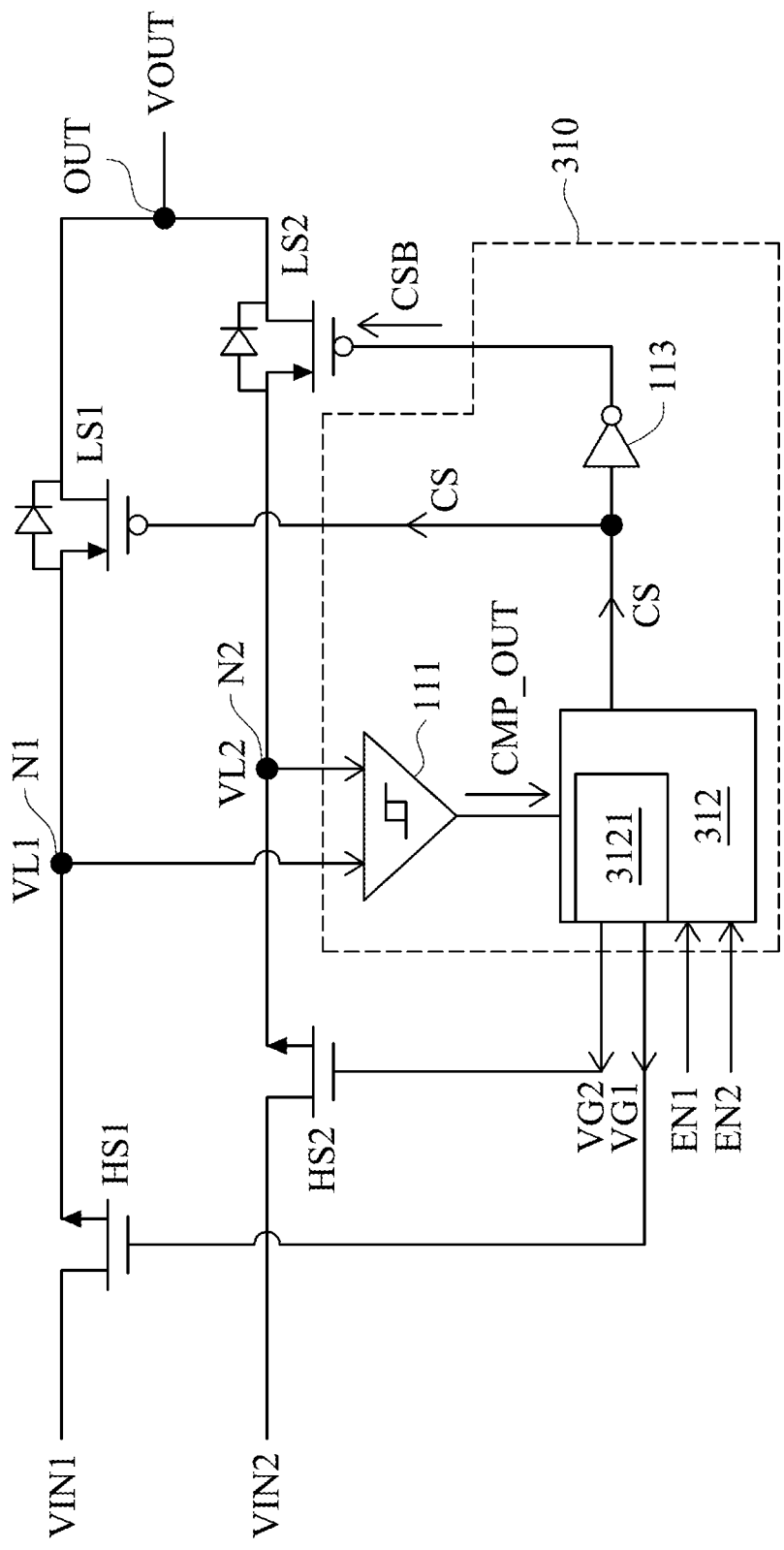
FIG. 3 is a schematic diagram of a power supplying circuit according to some embodiments of the present disclosure.

Reference is made to FIG. 3. FIG. 3 is a schematic diagram of a power supplying circuit 300 according to some embodiments of the present disclosure. The circuit architecture and operations of the power supplying circuit 300 in FIG. 3 are similar to the circuit architecture and operations of the power supplying circuit 100 in FIG. 1.

One of major differences between the power supplying circuit 300 and the power supplying circuit 100 is that, a low-voltage controller 312 in a control circuit 310 further include a gate voltage modulator circuit 3121 and the low-voltage controller 312 can further receive an enable signal EN1 and an enable signal EN2. The enable signals EN1-EN2 can be supplied from a digital circuit.

In some cases, similar to the low-voltage controller 112 in FIG. 1, the low-voltage controller 312 can control the high-voltage switch HS1, the low-voltage switch LS1, the high-voltage switch HS2, and the low-voltage switch LS2 according to the comparison result signal CMP_OUT from the low-voltage comparator 111.

In some cases, the low-voltage controller 312 can control the high-voltage switch HS1, the low-voltage switch LS1, the high-voltage switch HS2, and the low-voltage switch LS2 according to the enable signal EN1 and the enable signal EN2.

For example, when the enable signal EN1 has an enable level, the enable signal EN2 has a disable level. The low-voltage controller 312 can control the gate voltage modulator circuit 3121 to output the control signal VG1 according to the enable signal EN1 with the enable level, and control the gate voltage modulator circuit 3121 to output the control signal VG2 according to the enable signal EN2 with the disable level. For example, the gate voltage modulator circuit 3121 can output the control signal VG1 with a relatively high voltage and the control signal VG2 with a relatively low voltage to control the high-voltage switch HS1 and the high-voltage switch HS2 respectively. In addition, the low-voltage controller 312 can output the control signal CS with the first logic value (e.g., the logic value 0) according to the enable signal EN1 with the enable level and the enable signal EN2 with the disable level to turn on the low-voltage switch LS1, and the inverter 113 can generate the inversion control signal CSB with the second logic value (e.g., the logic value 1) according to the control signal CS with the first logic value (e.g., the logic value 0) to turn off the low-voltage switch LS2. In other words, the low-voltage controller 312 can enable the first power path corresponding to the input voltage VIN1 and disable the second power path corresponding to the input voltage VIN2 according to the enable signal EN1 with the enable level and the enable signal EN2 with the disable level.

On the contrary, when the enable signal EN2 has the enable level, the enable signal EN1 has the disable level. The low-voltage controller 312 can control the gate voltage modulator circuit 3121 to output the control signal VG2 according to the enable signal EN2 with the enable level, and can control the gate voltage modulator circuit 3121 to output the control signal VG1 according to the enable signal EN1 with the disable level. For example, the gate voltage modulator circuit 3121 can output the control signal VG2 with a relatively high voltage and the control signal VG1 with a relatively low voltage to control the high-voltage switch HS2 and the high-voltage switch HS1 respectively. In addition, the low-voltage controller 312 can output the control signal CS with the second logic value (e.g., the logic value 1) according to the enable signal EN2 with the enable level and the enable signal EN1 with the disable level to turn off the low-voltage switch LS1, and the inverter 113 can generate the inversion control signal CSB with the first logic value (e.g., the logic value 0) according to the control signal CS with the second logic value (e.g., the logic value 1) to turn on the low-voltage switch LS2. In other words, the low-voltage controller 312 can enable the second power path corresponding to the input voltage VIN2 and disable the first power path corresponding to the input voltage VIN1 according to the enable signal EN2 with the enable level and the enable signal EN1 with the disable level.

Figure 4:
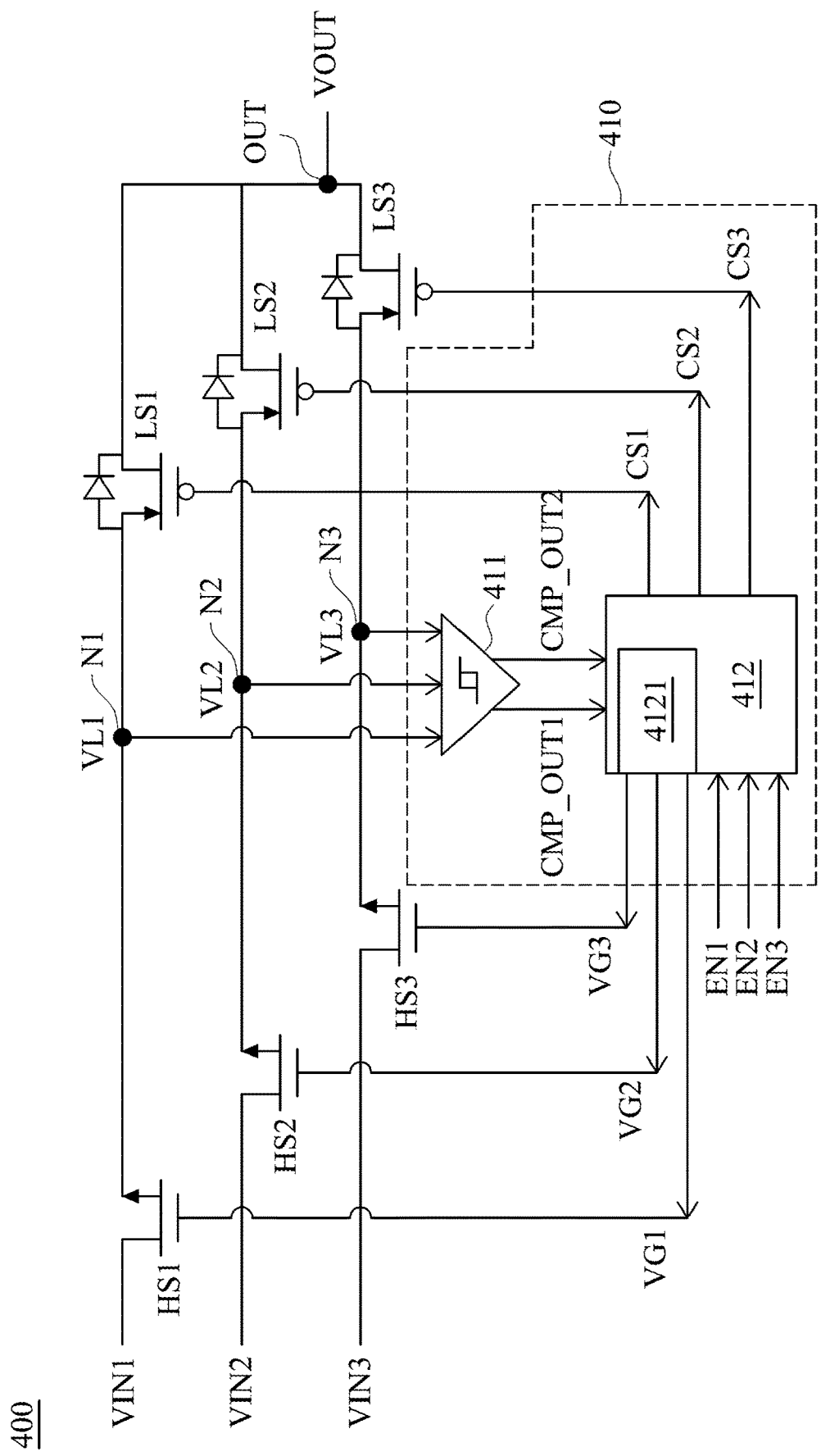
FIG. 4 is a schematic diagram of a power supplying circuit according to some embodiments of the present disclosure.

Reference is made to FIG. 4. FIG. 4 is a schematic diagram of a power supplying circuit 400 according to some embodiments of the present disclosure. The circuit architecture and operations of the power supplying circuit 400 in FIG. 4 are similar to the circuit architecture and operations of the power supplying circuit 300 in FIG. 3.

Major differences between the power supplying circuit 400 and the power supplying circuit 300 are described in following paragraphs.

The power supplying circuit 400 further includes a high-voltage switch HS3 and a low-voltage switch LS3. In some embodiments, the high-voltage switch HS3 can be implemented by an N-type transistor, and the low-voltage switch LS3 can be implemented by a P-type transistor.

The high-voltage switch HS3 is used to receive an input voltage VIN3. The low-voltage switch LS3 is coupled between the high-voltage switch HS3 and the output terminal OUT. The high-voltage switch HS3 and the low-voltage switch LS3 form a third power path. The high-voltage switch HS3 generate a node voltage VL3 at a node N3 according to the input voltage VIN3 and a control signal VG3 from a control circuit 410, in which the node N3 is between the high-voltage switch HS3 and the low-voltage switch LS3.

In some embodiments, voltage values of the input voltage VIN1, the input voltage VIN2, and the input voltage VIN3 are identical. In some embodiments, the voltage values of the input voltage VIN1, the input voltage VIN2, and the input voltage VIN3 are not identical.

The control circuit 410 can control the high-voltage switch HS1, the low-voltage switch LS1, the high-voltage switch HS2, the low-voltage switch LS2, the high-voltage switch HS3, and the low-voltage switch LS3 according to the node voltage VL1, the node voltage VL2, and the node voltage VL3 to control the first power path, the second power path, and the third power path such that the output terminal OUT is generated at the output voltage VOUT.

As illustrated in FIG. 4, the control circuit 410 includes a low-voltage comparator 411 and a low-voltage controller 412. The low-voltage controller 412 includes a gate voltage modulator circuit 4121.

The low-voltage comparator 411 can compare the node voltages VL1-VL3 to generate a comparison result signal CMP_OUT1 and a comparison result signal CMP_OUT2. The low-voltage controller 412 can generate the control signal VG1, the control signal VG2, a control signal VG3, a control signal CS1, a control signal CS2, and a control signal CS3 according to the comparison result signal CMP_OUT1 and the comparison result signal CMP_OUT2 to control the high-voltage switch HS1, the high-voltage switch HS2, the high-voltage switch HS3, the low-voltage switch LS1, the low-voltage switch LS2, and the low-voltage switch LS3. The detailed control method is similar to the previous embodiment, so it is not described herein again. In short, the low-voltage controller 412 can enable one power path corresponding to the maximum node voltage (a maximum one among the node voltages VL1-VL3) and disable other power paths.

Similar to the aforementioned embodiments, in some cases, the low-voltage controller 412 can control the high-voltage switch HS1, the low-voltage switch LS1, the high-voltage switch HS2, the low-voltage switch LS2, the high-voltage switch HS3, and the low-voltage switch LS3 according to the enable signal EN1, the enable signal EN2, and an enable signal EN3. For example, when the enable signal EN1 has the enable level, the low-voltage controller 412 can enable the first power path (i.e., the high-voltage switch HS1 and the low-voltage switch LS1) corresponding to the input voltage VIN1. When the enable signal EN2 has the enable level, the low-voltage controller 412 can enable the second power path (i.e., the high-voltage switch HS2 and the low-voltage switch LS2) corresponding to the input voltage VIN2. When the enable signal EN3 has the enable level, the low-voltage controller 412 can enable the third power path ((i.e., the high-voltage switch HS3 and the low-voltage switch LS3) corresponding to the input voltage VIN3.

The aforementioned "high-voltage" switches refer to switches with relatively high withstand voltages and the aforementioned "low-voltage" switches refer to switches with relatively low withstand voltages. In other words, a withstand voltage of the high-voltage switch HS3 is higher than a withstand voltage of the low-voltage switch LS3. For example, the withstand voltage of the high-voltage switch HS3 is equal to or higher than 20 volts, the withstand voltage of the low-voltage switch LS3 is equal to or lower than 5 volts, but the present disclosure is not limited thereto.

In some other embodiments, power supplying circuits can include more than three power paths. In other words, each of these power supplying circuits includes more than three high-voltage switches and more than three low-voltage switches. The circuit architectures and operations of these power supplying circuits are similar to the circuit architecture and operations of the power supplying circuit 400 in FIG. 4, so they are not described herein again.

Figure 5:
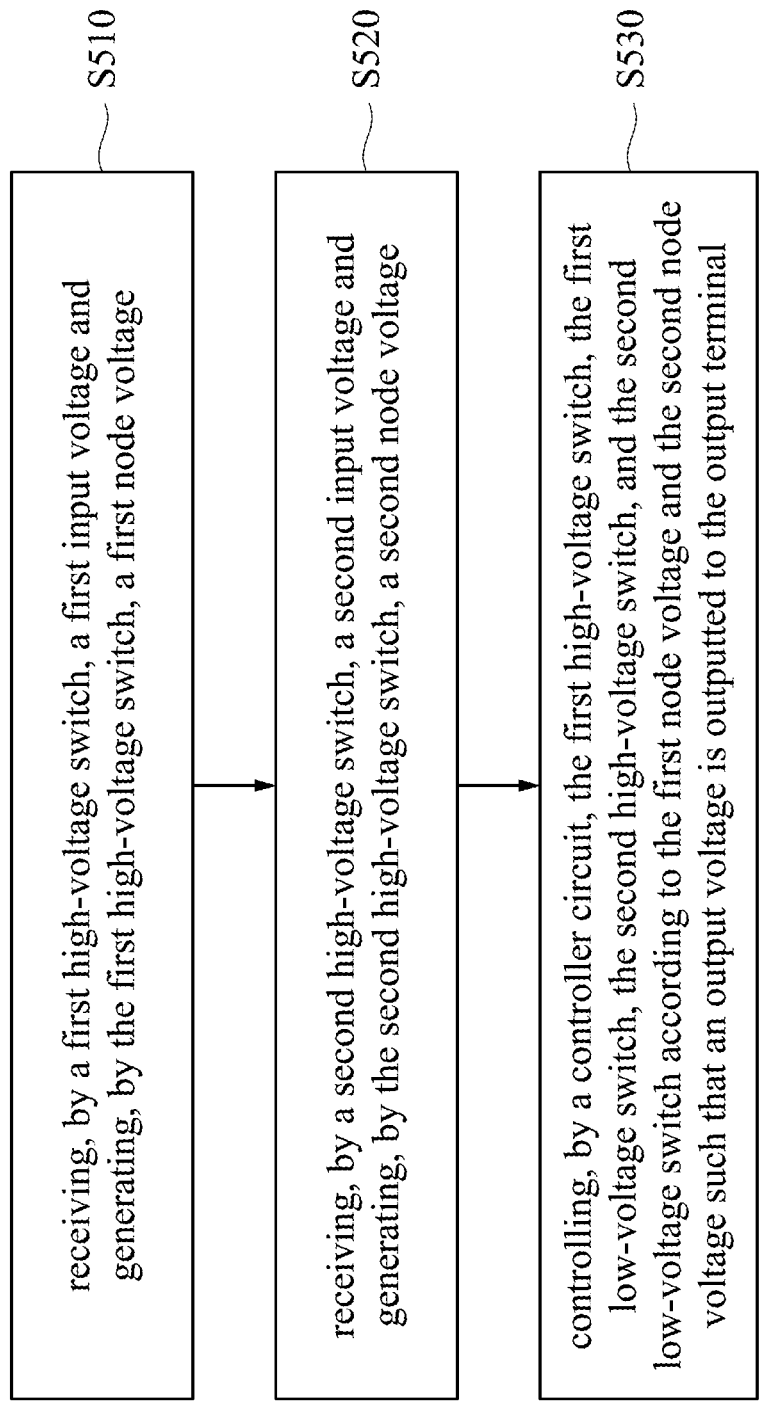
FIG. 5 is a flow diagram of a power supplying method according to some embodiments of the present disclosure.

Reference is made to FIG. 5. FIG. 5 is a flow diagram of a power supplying method 500 according to some embodiments of the present disclosure. In some embodiments, the power supplying method 500 can be applied to the power supplying circuit 100 in FIG. 1, the power supplying circuit 300 in FIG. 3, and the power supplying circuit 400 in FIG. 4. For better understanding, the power supplying method 500 is described with the power supplying circuit 100 in FIG. 1.

As illustrated in FIG. 5, the power supplying method 500 includes operations S510, S520, and S530.

In operation S510, the high-voltage switch HS1 receives the input voltage VIN1 and generates the node voltage VL1. In some embodiments, the high-voltage switch HS1 is implemented by the N-type transistor. The low-voltage switch LS1 is coupled between the high-voltage switch HS1 and the output terminal OUT.

In operation S520, the high-voltage switch HS2 receives the input voltage VIN2 and generates the node voltage VL2.

In some embodiments, the high-voltage switch HS2 is implemented by the N-type transistor. The low-voltage switch LS2 is coupled between the high-voltage switch HS2 and the output terminal OUT.

In operation S530, the control circuit 110 controls the high-voltage switch HS1, the low-voltage switch LS1, the high-voltage switch HS2, and the low-voltage switch LS2 according to the node voltage VL1 and the node voltage VL2 such that the output voltage VOUT is outputted to the output terminal OUT. In some embodiments, the low-voltage comparator 111 compares the node voltage VL1 with the node voltage VL2 to generate the comparison result signal CMP_OUT. The low-voltage controller 112 outputs the control signal VG1, the control signal VG2, and the control signal CS to control the high-voltage switch HS1, the low-voltage switch LS1, the high-voltage switch HS2, and the low-voltage switch LS2 according to the comparison result signal CMP_OUT.

As described above, in the power supplying circuit and the power supplying method of the present disclose, some elements can be implemented by low-voltage elements (with relatively low withstand voltage). Accordingly, the circuit area and the chip cost can be reduced.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power supplying circuit, comprising:
a first high-voltage switch configured to receive a first input voltage and generate a first node voltage at a source electrode of the first high-voltage switch;
a first low-voltage switch coupled between the first high-voltage switch and an output terminal;
a second high-voltage switch configured to receive a second input voltage and generate a second node voltage at a source electrode of the second high-voltage switch;
a second low-voltage switch coupled between the second high-voltage switch and the output terminal; and
a controller circuit configured to control the first high-voltage switch, the first low-voltage switch, the second high-voltage switch, and the second low-voltage switch according to the first node voltage and the second node voltage such that an output voltage is outputted to the output terminal;
wherein the controller circuit is electrically connected to the source electrode of the first high-voltage switch to receive the first node voltage;
wherein the controller circuit is electrically connected to the source electrode of the second high-voltage switch to receive the second node voltage;
wherein the controller circuit comprises:
a low-voltage comparator configured to compare the first node voltage and the second node voltage to generate a comparison result signal;
a low-voltage controller configured to control the first high-voltage switch, the first low-voltage switch, the second high-voltage switch, and the second low-voltage switch according to the comparison result signal or at least one enable signal; and
an inverter configured to receive a control signal and generate an inversion control signal according to the control signal,
wherein the control signal is configured to control the first low-voltage switch, and the inversion control signal is configured to control the second low-voltage switch; and
wherein when the first node voltage is higher than the second node voltage and a difference between the first node voltage and the second node voltage is greater than a threshold voltage, the low-voltage comparator outputs the comparison result signal with a first logic value.

2. The power supplying circuit of claim 1, wherein a withstand voltage of the first high-voltage switch is higher than a withstand voltage of the first low-voltage switch, and a withstand voltage of the second high-voltage switch is higher than a withstand voltage of the second low-voltage switch.

3. The power supplying circuit of claim 2, wherein the withstand voltage of the first high-voltage switch or the withstand voltage of the second high-voltage switch is equal to or higher than 20 volts, wherein the withstand voltage of the first low-voltage switch or the withstand voltage of the second low-voltage switch is equal to or lower than 5 volts.

4. The power supplying circuit of claim 1, wherein the first high-voltage switch and the second high-voltage switch are implemented by N-type transistors, wherein the first low-voltage switch and the second low-voltage switch are implemented by P-type transistors.

5. The power supplying circuit of claim 1, wherein the low-voltage comparator is implemented with a voltage hysteresis mechanism.

6. The power supplying circuit of claim 1, wherein when the second node voltage is higher than the first node voltage and the difference between the second node voltage and the first node voltage is greater than the threshold voltage, the low-voltage comparator outputs the comparison result signal with a second logic value.

7. The power supplying circuit of claim 1, wherein the at least one enable signal comprises a first enable signal and a second enable signal,
wherein when the first enable signal has an enable level, the low-voltage controller turns on the first low-voltage switch.

8. The power supplying circuit of claim 7, wherein when the second enable signal has the enable level, the low-voltage controller turns on the second low-voltage switch.

9. The power supplying circuit of claim 1, wherein the low-voltage controller comprises a gate voltage modulator circuit, and the gate voltage modulator circuit is configured to control the first high-voltage switch and the second high-voltage switch.

10. The power supplying circuit of claim 1, further comprising:
a third high-voltage switch configured to receive a third input voltage and generate a third node voltage; and
a third low-voltage switch coupled between the third high-voltage switch and the output terminal,
wherein the control circuit is further configured to control the first high-voltage switch, the first low-voltage switch, the second high-voltage switch, the second low-voltage switch, the third high-voltage switch, and the third low-voltage switch according to the first node voltage, the second node voltage, and the third node voltage.

11. The power supplying circuit of claim 10,
wherein the low-voltage comparator is further configured to compare the first node voltage, the second node voltage, and the third node voltage to generate a first comparison result signal and a second comparison result signal; and
wherein the low-voltage controller is further configured to control the first high-voltage switch, the first low-voltage switch, the second high-voltage switch, the second low-voltage switch, the third high-voltage switch, and the third low-voltage switch according to the first comparison result signal and the second comparison result signal or according to the at least one enable signal.

12. A power supplying method, comprising:
receiving, by a first high-voltage switch, a first input voltage and generating, by the first high-voltage switch, a first node voltage at a source electrode of the first high-voltage switch;
receiving, by a second high-voltage switch, a second input voltage and generating, by the second high-voltage switch, a second node voltage at a source electrode of the second high-voltage switch; and
controlling, by a controller circuit, the first high-voltage switch, a first low-voltage switch, the second high-voltage switch, and a second low-voltage switch according to the first node voltage and the second node voltage such that an output voltage is outputted to an output terminal,
wherein the first low-voltage switch is coupled between the first high-voltage switch and the output terminal, and the second low-voltage switch is coupled between the second high-voltage switch and the output terminal;
wherein the controller circuit is electrically connected to the source electrode of the first high-voltage switch to receive the first node voltage;
wherein the controller circuit is electrically connected to the source electrode of the second high-voltage switch to receive the second node voltage;
wherein the power supplying method further comprises:
comparing, by a low-voltage comparator in the controller circuit, the first node voltage and the second node voltage to generate a comparison result signal;
controlling, by a low-voltage controller in the controller circuit, the first high-voltage switch, the first low-voltage switch, the second high-voltage switch, and the second low-voltage switch according to the comparison result signal or at least one enable signal; and
receiving, by an inverter in the controller circuit, a control signal and generating, by the inverter, an inversion control signal according to the control signal;
wherein the control signal is configured to control the first low-voltage switch, and the inversion control signal is configured to control the second low-voltage switch; and
wherein when the first node voltage is higher than the second node voltage and a difference between the first node voltage and the second node voltage is greater than a threshold voltage, the low-voltage comparator outputs the comparison result signal with a first logic value.

13. The power supplying method of claim 12, wherein a withstand voltage of the first high-voltage switch is higher than a withstand voltage of the first low-voltage switch, and a withstand voltage of the second high-voltage switch is higher than a withstand voltage of the second low-voltage switch.

14. The power supplying method of claim 13, wherein the withstand voltage of the first high-voltage switch or the withstand voltage of the second high-voltage switch is equal to or higher than 20 volts, wherein the withstand voltage of the first low-voltage switch or the withstand voltage of the second low-voltage switch is equal to or lower than 5 volts.

15. A power supplying circuit, comprising:
a first high-voltage switch configured to receive a first input voltage and generate a first node voltage at a source electrode of the first high-voltage switch;
a first low-voltage switch coupled between the first high-voltage switch and an output terminal;
a second high-voltage switch configured to receive a second input voltage and generate a second node voltage at a source electrode of the second high-voltage switch;
a second low-voltage switch coupled between the second high-voltage switch and the output terminal;
a third high-voltage switch configured to receive a third input voltage and generate a third node voltage at a source electrode of the third high-voltage switch;
a third low-voltage switch coupled between the third high-voltage switch and the output terminal; and
a controller circuit configured to control the first high-voltage switch, the first low-voltage switch, the second high-voltage switch, and the second low-voltage switch, the third high-voltage switch, and the third low-voltage switch according to the first node voltage, the second node voltage, and the third node voltage such that an output voltage is outputted to the output terminal;
wherein the controller circuit is electrically connected to the source electrode of the first high-voltage switch to receive the first node voltage;
wherein the controller circuit is electrically connected to the source electrode of the second high-voltage switch to receive the second node voltage;
wherein the controller circuit is electrically connected to the source electrode of the third high-voltage switch to receive the third node voltage; and
wherein the controller circuit comprises:
a low-voltage comparator configured to compare the first node voltage, the second node voltage, and the third node voltage to generate a first comparison result signal and a second comparison result signal; and
a low-voltage controller configured to control the first high-voltage switch, the first low-voltage switch, the second high-voltage switch, the second low-voltage switch, the third high-voltage switch, and the third low-voltage switch according to the first comparison result signal and the second comparison result signal or according to at least one enable signal.

* * * * *